Patented Feb. 25, 1936

2,031,958

UNITED STATES PATENT OFFICE 2,031,958

GLASS PERMEABLE TO ULTRAVIOLET RAYS

Waldemar Kaufmann and Everhard Bungartz, Frankfort-on-the-Main, Germany, assignors to I. G. Farbenindustrie Aktiengesellschaft, Frankfort-on-the-Main, Germany No Drawing. Application March 24, 1933, Serial No. 662,637. In Germany May 20, 1931

11 Claims. (Cl. 106—36.1)

The present invention relates to glass batch yielding a glass permeable to ultraviolet rays.

In recent times glass which is permeable to ultraviolet rays has found an increased application in various spheres. Silicate glass, however, is permeable only down to a wave length of about 2900 to 2800 angstrom units. An improved permeability to ultraviolet rays has hitherto been attained particularly in glass which consists chiefly of calcium metaphosphate. But such glass cannot generally be used for industrial purposes, especially as window glass or apparatus glass, because it has only a low resistance to water. When tested according to the standard method of the "Deutsche Glastechnische Gesellschaft" (see "Berichte der Deutschen Glastechnischen Gesellschaft", 1929, vol. 6, page 640) this kind of glass yields an extract prepared in the prescribed manner which after evaporation leaves a residue of more than 2 grams per 100 cc.

We have now found that, in contrast with the not very stable glass made from magnesium metaphosphate or calcium metaphosphate, glass consisting chiefly of barium metaphosphate is colorless, very resistant to water and atmospheric influence and also has a very high permeabiliy to ultraviolet light namely one which may attain about 2000 angstrom units. When tested according to the said standard method, such glass shows a residue of only about 0.3 gram.

If to this glass which contains chiefly barium metaphosphate other metaphosphates are added, a further decrease of the solubility is developed, this being a surprising fact.

It is particularly useful in practice to add metaphosphates of the alkaline-earth metals, especially calcium metaphosphate or magnesium metaphosphate or a mixture of these metaphosphates in a quantity which does not exceed that of barium metaphosphate contained in the glass.

If to the barium metaphosphate aluminium metaphosphate is added instead of or in addition to other phosphates of the alkaline-earth metals, the permeability to ultraviolet rays and the absence of coloration of the glass are not affected by the addition of aluminium. This is the more surprising as in the case of silicate glass for instance it has been stated that diminution of the permeability to ultraviolet rays is associated with the increasing content of aluminium. The resistance to water of the barium metaphosphate glass is, however, considerably increased by the addition of aluminium metaphosphate so that the resistance to water of this glass is not inferior to that of the usual apparatus glass consisting of silicate glass. It is advisable to choose the content of aluminium metaphosphate in the glass batch in such a manner that at least 5 mols. of aluminium oxide are present for 100 mols. of the basic constituents.

It may be advantageous that the metaphosphate of barium or of the other metals does not contain a quantity of phosphoric acid which stoichiometrically corresponds with the content of metal oxide, but that its content of phosphoric acid is higher or lower than that corresponding with the theoretical composition of the metaphosphate. The maximum or minimum content of phosphoric acid of the metaphosphate or the mixtures of metaphosphates permissible in the manufacture of a glass which corresponds with all technical requirements depends on the composition of the glass batch and lies about 25 to 50 per cent. above or below the stoichiometric ratio.

In order to enlarge the range of softening of the barium-metaphosphate-glasses herein described, it may be advantageous to add silicic acid or boric acid or a mixture of these two acids to the glass batch.

The following examples serve to illustrate the invention, but they are not intended to limit it thereto:

(1.) 350 cc. of phosphoric acid of specific gravity 1.75 are diluted with twice to three times their weight of water, and heated to boiling and there are introduced, while stirring, a mixture of 250 grams of barium carbonate and 180 grams of calcium carbonate. The product obtained by evaporation until the temperature is about 250° C. is heated to 1200° C. in a crucible of a material free from iron. The glass thus obtained has a solubility of 225 milligrams when tested according to the said standard method.

(2.) A metaphosphate glass is made in the manner described in Example 1 from 374 grams of barium carbonate 48 grams of magnesium oxide of 90 per cent. strength and 428 cc. of phosphoric acid (specific gravity 1.75). This glass shows a solubility of 181 milligrams by the standard test.

(3.) A glass is made in the manner described above by heating 374 grams of barium carbonate, 88 grams of calcium carbonate, 64 grams of magnesium oxide of 90 per cent. strength and 580 cc. of phosphoric acid (specific gravity 1.75). The solubility of the glass tested according to the standard test amounts to 217 milligrams.

(4.) A mixture of 70 grams of barium carbonate and 7 grams of aluminium oxide is introduced into 70 cc. of phosphoric acid of specific gravity 1.70 which has been heated to 100° C. The product obtained is fused at 1300° C. in a crucible of a material free from iron, for instance quartz or alumina. The glass thus obtained has a solubility of 97 milligrams when tested according to the said standard method.

(5.) A glass is made in the manner described above from 70 grams of barium carbonate, 14 grams of aluminium oxide and 125 cc. of phosphoric acid of specific gravity 1.70. This glass shows a solubility of 70 milligrams by the standard test.

(6.) 350 grams of barium carbonate, 110 grams of magnesium oxide of 90 per cent. strength and 70 grams of aluminium oxide are mixed with 1200 cc. of phosphoric acid of specific gravity 1.70 which has been diluted with once to twice its weight of water; the mixture thus obtained is evaporated, the temperature being gradually raised to 250° C. to 300° C. The solid mass obtained after cooling is heated at 1200 C. to 1300° C. in a crucible of a material free from iron until a clear fluid glassy melt is formed. When tested according to the said standard method the glass obtained leaves a residue of 95 milligrams and in a layer of a thickness of 2 mm. has a permeability to ultraviolet light which attains 2100 angstrom units.

We claim:

1. As a composition of matter, a glass batch having as its chief constituent barium metaphosphate and as an addition agent the metaphosphate of at least one alkaline earth metal, said glass batch yielding a glass characterized in that it is permeable to ultra-violet rays and resistant to water.

2. As a composition of matter, a glass batch comprising barium metaphosphate as its chief constituent and the metaphosphate of at least one alkaline earth metal, the phosphoric acid content of which is, at the most, 50% higher than that corresponding to the theoretical composition of the metaphosphates, said glass batch yielding a glass characterized in that it is permeable to ultra-violet rays and resistant to water.

3. As a composition of matter, a glass batch comprising barium metaphosphate as its chief constituent and the metaphosphate of at least one alkaline earth metal, the phosphoric acid content of which is, at the most, 50% lower than that corresponding to the theoretical composition of the metaphosphates, said glass batch yielding a glass characterized in that it is permeable to ultra-violet rays and resistant to water.

4. As a composition of matter, a glass batch comprising barium metaphosphate as its chief constituent and aluminum metaphosphate, said glass batch yielding a glass characterized in that it is permeable to ultra-violet rays and resistant to water.

5. As a composition of matter, a glass batch comprising barium metaphosphate as its chief constituent, the metaphosphate of at least one alkaline earth metal and aluminum metaphosphate, said glass batch yielding a glass characterized in that it is permeable to ultra-violet rays and resistant to water.

6. As a composition of matter, a glass batch comprising barium metaphosphate as its chief constituent, the metaphosphate of at least one alkaline earth metal and aluminum metaphosphate, the aluminum metaphosphate being used in such a quantity that at least five mols. of aluminum oxide are present for 100 mols. of the basic constituents, said glass batch yielding a glass characterized in that it is permeable to ultra-violet rays and resistant to water.

7. As a composition of matter, a glass batch comprising barium metaphosphate as its chief constituent, the metaphosphate of at least one alkaline earth metal and silicic acid, said glass batch yielding a glass characterized in that it is permeable to ultra-violet rays and resistant to water.

8. As a composition of matter, a glass batch comprising barium metaphosphate as its chief constituent, the metaphosphate of at least one alkaline earth metal, aluminum metaphosphate and silicic acid, said glass batch yielding a glass characterized in that it is permeable to ultra-violet rays and resistant to water.

9. As a composition of matter, a glass batch comprising barium metaphosphate as its chief constituent, the metaphosphate of at least one alkaline earth metal and boric acid, said glass batch yielding a glass characterized in that it is permeable to ultra-violet rays and resistant to water.

10. As a composition of matter, a glass batch comprising barium metaphosphate as its chief constituent, the metaphosphate of at least one alkaline earth metal, aluminum metaphosphate and boric acid, said glass batch yielding a glass characterized in that it is permeable to ultra-violet rays and resistant to water.

11. As a composition of matter, a glass batch comprising barium metaphosphate as its chief constituent, the metaphosphate of at least one alkaline earth metal, aluminium metaphosphate, silicic acid and boric acid, said glass batch yielding a glass characterized in that it is permeable to ultra-violet rays and resistant to water.

WALDEMAR KAUFMANN.
EVERHARD BUNGARTZ.